United States Patent [19]

Thompson

[11] Patent Number: 5,048,324
[45] Date of Patent: Sep. 17, 1991

[54] ABOVEGROUND TANK LEAK DETECTION SYSTEM AND METHOD

[75] Inventor: Glenn M. Thompson, Tucson, Ariz.

[73] Assignee: Tracer Research Corporation, Tucson, Ariz.

[21] Appl. No.: 378,415

[22] Filed: Jul. 11, 1989

[51] Int. Cl.⁵ .............................................. G01N 1/02
[52] U.S. Cl. ................................. 73/40.7; 73/40.5 R; 73/49.2; 340/605
[58] Field of Search ............. 73/40.5 R, 40.7, 49.2 T; 340/605

[56] References Cited

U.S. PATENT DOCUMENTS

| | | | |
|---|---|---|---|
| 3,964,292 | 6/1976 | Jackson | 73/40.7 |
| 3,995,472 | 12/1976 | Murray | 73/49.2 T |
| 4,020,697 | 5/1977 | Jander | 73/40.5 R |
| 4,709,577 | 12/1987 | Thompson | 73/40.7 |
| 4,725,551 | 2/1988 | Thompson | 73/40.7 |
| 4,740,777 | 4/1988 | Slocum et al. | 73/40.5 R |
| 4,754,136 | 6/1988 | Blakely | 73/49.2 T |
| 4,896,528 | 1/1990 | Lewis | 73/49.2 T |

Primary Examiner—Hezron E. Williams
Assistant Examiner—Craig Miller
Attorney, Agent, or Firm—David G. Rosenbaum

[57] ABSTRACT

An apparatus and method for detecting fluid leaks from aboveground fluid storage tanks is disclosed. The invention consists of radially disposing a plurality sample probes in the subsurface soil area underneath the aboveground tank. Each of the plurality of sample probes are connected to a vacuum pump and a sampling port to collect the soil gasses drawn from the subsurface soil area. At least one air injection probe is disposed in the subsurface soil area and extends underneath the aboveground tank to an approximate center point of the tank circumference. The volatile liquid phase tracer is mixed with the fluid in the tank, and soil gas samples are evacuated through the subsurface soil area underneath the tank into the sample probes, collected and analyzed for the presence of the gas phase tracer.

58 Claims, 4 Drawing Sheets

ABOVEGROUND TANK LEAK DETECTION SYSTEM AND METHOD

BACKGROUND OF THE INVENTION

This invention relates generally to a rapid leak detection apparatus and method for aboveground fluid storage tanks. More particularly, the present invention relates to an apparatus and method for the rapid detection and location of fluid leaks from aboveground fluid storage tanks.

Currently there are two principal systems and methods for leak testing of aboveground fluid storage tanks. Vacuum box testing requires the emptying of the tank, cleaning the tank floor and applying a vacuum to portions of the tank floor to test for leaks. Under this method, loss of vacuum from any portion of the tank floor is indicative of a leak in that portion of the tank floor. This testing method requires that the tank be taken out of service for a considerable period of time for cleaning and manual inspection, which with fuel storage tanks, typically poses substantial risk of injury to the tank inspectors. Moreover, the vacuum box system and method fails to detect very small defects in the tank. A second method utilizes sonic transducers placed at several points around the circumference of the tank. Under this method, fluid escaping from the tank will generate sonic waves which are sensed by the transducers. Triangulation from the transducer locations then localizes the leak. This sonic sensing method, however, suffers from ambient sonic interferences and, due to difficulty in verifying sensitivity, is of uncertain value for detecting very small leaks.

To date there are no known testing procedures for detection and localization of aboveground tank leaks without taking the tank out of service. The present invention provides a tracer leak detection method which utilizes a highly volatile liquid chemical added to the fluid stored in the tank. When a leak occurs in the tank structure, the fluid contained within tank leaks into the sand base underneath the tank. The tracer volatilizes and separates from the fluid by vaporization and disperses into the surrounding soil by molecular diffusion.

SUMMARY OF THE INVENTION

Typically, aboveground fluid storage tanks are constructed on a foundation consisting of a large concrete ring having a diameter corresponding to the diameter of the tank floor. The inner opening of the large concrete ring is filled with tamped oiled sand which provides a porous support for the tank floor. The oiled sand also provides a porous fluid conduit which transports leaking tracers from the leakage points to the tracer sampling devices.

The present invention advantageously applies chemical tracer technology to directly detect and localize very small leaks from this type of aboveground fluid storage tanks as well as other types of aboveground fluid storage tank installations wherein a porous air conductive backfill material is underneath the tank. A highly volatile, detectible organic tracer is introduced in the liquid phase into the fluid contained within the aboveground tank. Fluid leaking from the tank contains the liquid phase tracer in the leak. Upon encountering air entrapped in interstitial spaces of the tamped oiled sand, the liquid phase tracer volatilizes to the gas phase. Soil gas samples are collected from the subsurface soil area underlying oiled sand. Gas chromatography of the collected soil gas samples will reveal the presence of the gas phase tracer, if any is present in the collected sample. The selection of tracer is important to insure that no interference from the fluid contained in the tank or ambient chemicals in the surrounding soil or the oiled sand is encountered analyzing the soil gas samples. The fluid in the aboveground tank may include a liquid or gas fuel, such as gasoline, natural gas, methane, butane, propane, synthetic gas or the like.

The tracer technology employed in the underground pipe leak detection system of the present invention relates to U.S. Pat. Nos. 4,725,551 and 4,709,557 issued to Glenn Thompson, the disclosures and teachings of which are expressly incorporated herein. The tracer is normally a highly volatile organic tracer having a boiling point in the range of about $-72°$ C. to about $150°$ C., with the preferred compounds being of the group known as fluorinated halocarbons, commonly referred to as halocarbons or fluorocarbons. The leak detection system of the present invention provides a highly sensitive system for detecting and locating leaks in aboveground tanks. When coupled with the difficulty of monitoring and detecting such leaks under current technology, the present invention represents a significant advancement in the state of the art.

The method of the present invention also contemplates a method for locating leaks in aboveground tanks. The method consists of radially disposing a plurality sample probes in the subsurface soil area underneath the aboveground tank. Each of the plurality of sample probes are connected to a vacuum pump and a sampling port to collect the soil gasses drawn from the subsurface soil area. At least one air injection probe is disposed in the subsurface soil area and extends underneath the aboveground tank to an approximate center point of the tank circumference. The volatile liquid phase tracer is mixed with the fluid in the tank, and soil gas samples are evacuated through the subsurface soil area underneath the tank into the sample probes, collected and analyzed for the presence of the gas phase tracer.

These and other features and advantages of the present invention will be more fully understood from the following more detailed description of the preferred embodiment of the present invention with reference to the accompanying Figures, in which like features are identified by like reference numerals.

DETAILED DESCRIPTION OF THE PREFERRED EMBODIMENT

Figure 1:
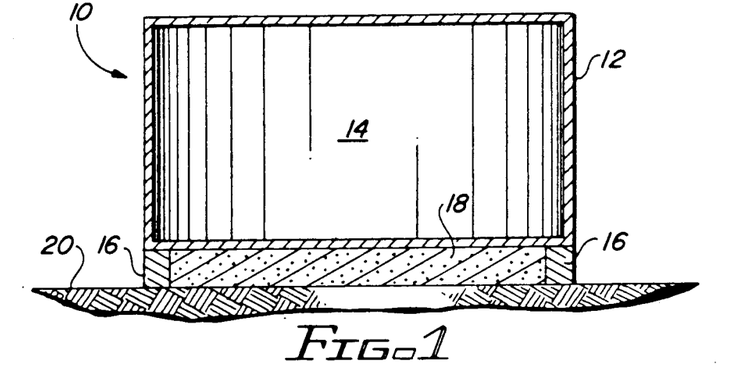
FIG. 1 is a side elevational view of an idealized section of an aboveground fluid storage tank installation.

Referring to FIG. 1 there is shown an idealized cross-sectional view of a typical above-ground fluid storage tank installation 10. A fluid storage tank 12, having a fluid storage chamber 14 within the tank 12, is constructed on a large concrete ring 16. Concrete ring 16 may be disposed directly on the supporting backfill 20 or partially or entirely disposed within the supporting backfill 20. Concrete ring 16 typically has a diameter which corresponds to the diameter of the fluid storage tank 12, such concrete ring 16 supports the entire circumference of the fluid storage tank 12. A layer of tamped and oiled sand 18 is disposed within the inner opening of concrete ring 16 to support the flooring of tank 12, provides an absorptive layer between tank 12 and the underlying backfill. The layer of tamped and oiled sand 18 is typically the only barrier to prevent fluid leaks from tank 12 from invading the underlying backfill 20. However, the tamped and oiled sand 18 is porous and air conductive. Thus, fluid leaking from tank 12 does permeate this layer 18 and invade the underlying backfill 20. It will be appreciated, by those skilled in the art, that slow leakage from the tank, over time, will saturate the tamped and oiled sand layer 18 and invade the underlying backfill 20, thereby presenting a substantial risk of groundwater contamination. Those skilled in the art will further understand that the system and method of the present invention will have utility with virtually any type of aboveground tank installation, whether the tank is supported on a concrete ring, a concrete slab, a tamped oiled sand layer or earthen backfill.

Figure 2:
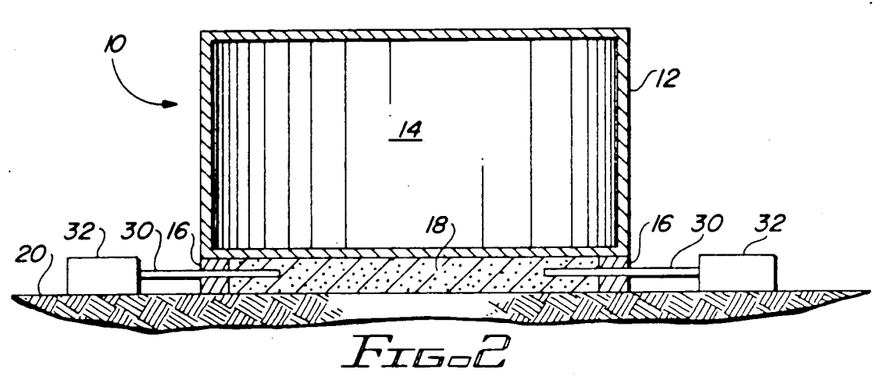
FIG. 2 is a side elevational view of an idealized section of an aboveground fluid storage tank installation diagrammatically showing the aboveground tank leak detection system of the present invention associated therewith.
Figure 3:
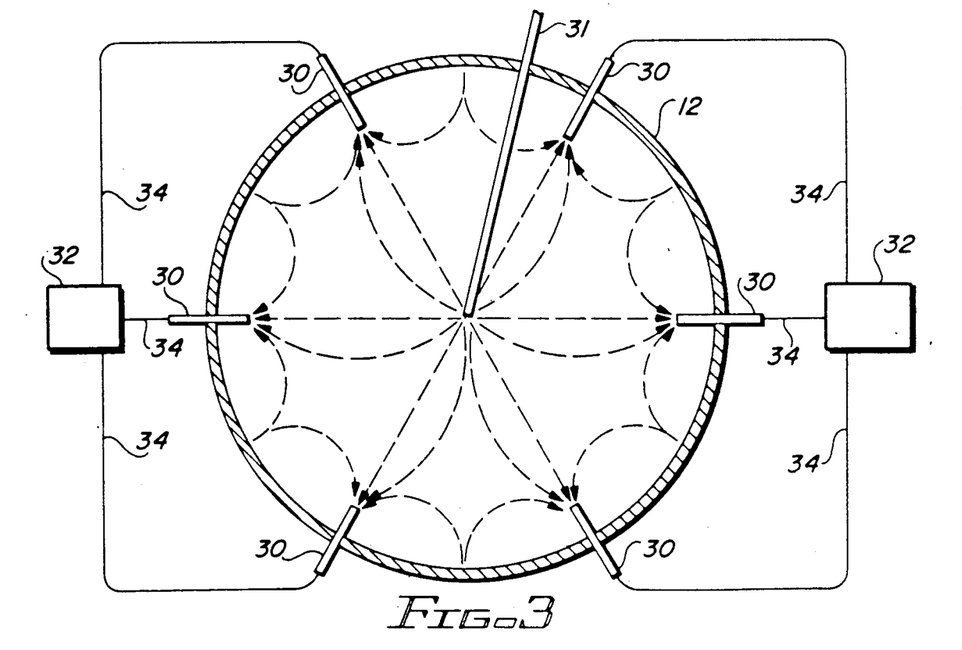
FIG. 3 is a diagrammatic plan view of the aboveground tank leak detection system of the present invention.

The aboveground tank leak detection system of the present invention is illustrated in FIGS. 2 and 3. As more fully described in U.S. Pat. Nos. 4,725,551 and 4,709,557, the fluid contained in chamber 14 of tank 12 is doped with a tracer. The tracer is preferably a highly detectable volatile organic tracer such as a fluorinated halocarbon compound, having a boiling point typically, but not necessarily, lower than the boiling point of the fluid stored in the storage tanks and preferably within the range of about −72° to about 150° C. A tracer concentration in the fluid of at least approximately ten parts per million, or 0.001 percent, is desired to ensure detection of very small leaks. These tracer chemicals are easily detected at extremely low concentrations, i.e. in the parts per trillion range, by gas chromatography. By employing these tracer chemicals at concentrations of 10 ppm, even small leaks, e.g. on the order of 0.05 gallons/hour, are readily detected without interfering with the chemical or physical properties of the products contained within the tank. Should a leak develop in the tank 12, the leaking fluid would contain the tracer in the liquid phase. Immediately upon encountering air present in either the tamped oiled sand layer 18 or the underlying backfill 20, the tracer volatilizes to the gas phase and diffuses through existing interstitial spaces in the tamped oiled sand layer 18 and the underlying backfill 20. The inventive leak detection system establishes a conductive subsurface air flow of soil gasses 5 in the tamped oiled sand layer 18 or the underlying backfill 20 and draws subsurface soil gasses from these locations. If fluid is leaking from the tank 12, the presence of tracer in the evacuated soil gasses will be detected. A plurality of sample probes 30 are horizontally and radially disposed in the subsurface soil 20 or the tamped oiled sand layer 18 underneath the fluid storage tank 12. Each of the plurality of sample probes 30 are connected, by vacuum lines 34, to a vacuum pump 32 such that each sample probe 30 draws a substantially equal vacuum. It will be appreciated, by those skilled in the art, that for each sample probe 30 to draw a substantially equal vacuum pressure, varying numbers of sample probes 30 will be required depending upon the diameter of the tank 12 being tested.

Each of the plurality of sample probes 30 consist of a hollow tubular member, or plurality of hollow tubular members joined together, of a sufficient length to horizontally penetrate the sand layer 18 or the subsurface soil area 20 to a distance within the perimeter of the tank needed to generate the subsurface air flow of soil gasses 5 from all portions of the tank. Sample probes 30 may be made of metal, composite or plastic and have either a single terminal end opening or a terminal end opening and a plurality of apertures disposed along the length thereof which penetrates the sand layer 18 or the subsurface soil area 20 underneath the tank 12. According to a preferred embodiment of the present invention, it has been found desirable to utilize metal or plastic sample probes having a single terminal end opening and a length sufficient to drive the sample probe 30 into the sand layer 18 or the subsurface soil area 20 horizontally to a distance of about five to one hundred fifty feet, depending upon tank diameter, inside the perimeter of the tank 12 at a depth of about four to twelve inches below the floor of tank 12.

An adjunct air injection probe 31 is also disposed within the sand layer 18 or the subsurface soil area 20 and underneath tank 12. Air injection probe 31 is driven into position and terminates at the approximate center point of the tank 12. This central position ensures that, upon introduction of air through the air injection probe 31, each of the plurality of sample probes 31 are exposed to substantially equal subsurface air flow vectors from the air injection probe 31 and that all areas underneath the tank 12 are exposed to the subsurface flow of soil gasses 5. In this manner, any tracer escaping from a fluid leak will be detected regardless of the location of the leak in the tank 12.

In accordance with the method of the present invention, after the plurality of sample probes 30 and air injection probe 31 are disposed in sand layer 18 or the subsurface soil area 20, soil gas samples are withdrawn from the sand layer 18 or the subsurface soil area 20 and analyzed to provide background readings and to determine whether any chemicals are present in the samples which would interfere with the tracer chemical used. Based upon the background readings, a suitable chemical tracer may be selected and added to the fluid in the tank 12. The tracer is preferably selected from the group consisting of fluorinated halocarbons, methanes, and ethanes having a boiling point in the liquid phase in the range of about −72° C. and 150° C. More specifically, the tracer may consist of halogenated methanes, halogenated ethanes, halogenated ethenes, sulfurhexafluoride, perfluorodecalin, and perfluoro 1,3 dimethylcyclohexane. The group of halogenated methane is preferably selected from the group consisting of chlorobromodifluoromethane, trichlorofluoromethane, trifluoroiodomethane, trifluorobromomethane, dibromodifluoromethane, dichlorodifluoromethane and tetrafluoromethane. The halogenated ethane is preferably selected from the group consisting of dichlorotetrafluoroethane, hexafluoroethane, trichlorotrifluoroethane, dibromotetrafluoroethane and tetrachlorodifluoroethane. The halogenated ethene is preferably tetrafluoroethene.

After selection of the appropriate tracer, the tracer is added to the fluid in the tank 12 to a concentration of approximately 10 parts per million, by introducing the tracer into the tank pipeline as the tank receives fuel. Mixing of the tracer is facilitated by the filing process and normal operations involving the tank are not affected during or after tracer introduction. Tank testing may commence approximately 24 hours after introduction of the tracer.

The actual leak testing method consists of a two-phase testing approach. Test phase one is an evacuation only phase, whereby soil gasses 5 are evacuated, by the vacuum pumps 32, from the sand layer 18 or the subsurface area 20 through the plurality of sample probes 30 for collection and analysis. Test phase two is an air injection-evacuation phase, in which air is injected through the air injection probe 31 into the sand layer 18 or the subsurface soil area 20 simultaneously with the evacuation of the soil gasses 5 through the plurality of sample probes 30 for collection and analysis. While, in accordance with the preferred embodiment of the present invention, it is desirable to employ both phase one and phase two test procedures, it will be understood and appreciated by those skilled in the art that varying backfill conditions will permit employing either or both of the phase one or phase two tests.

Figure 4:
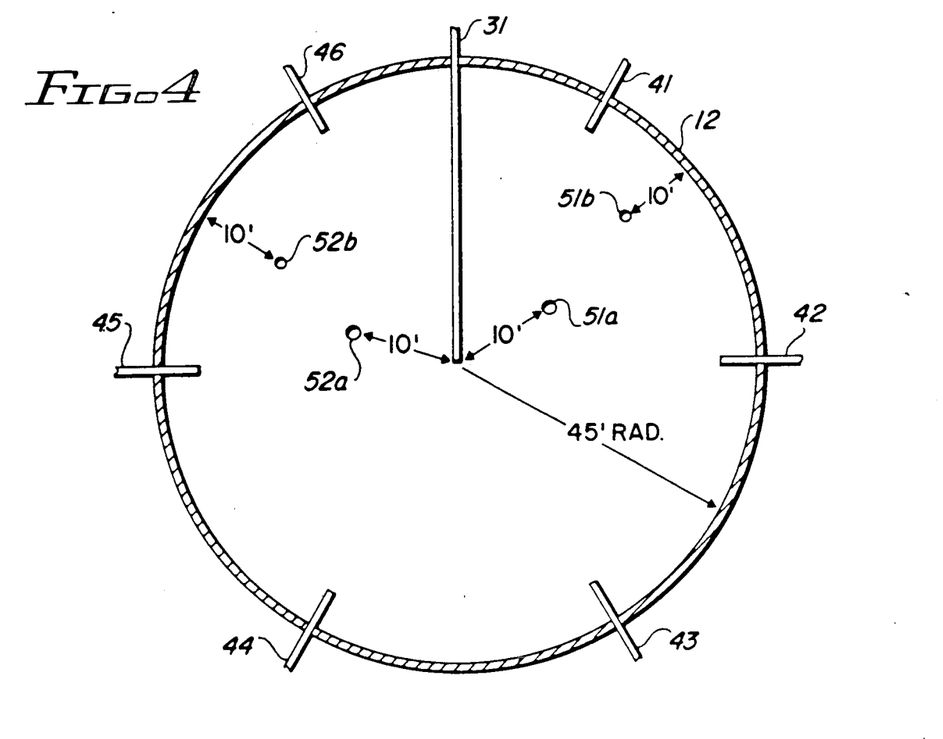
FIG. 4 is a diagrammatic plan view of the aboveground tank leak detection system of the present invention illustrating a leak simulation test as hereinafter described.

FIG. 4 diagrammatically represents a simulated leak test conducted on an empty fluid storage tank. A simulated leak test was performed under maximum air pressure and under variable air pressure. Holes 51a, 51b, 52a and 52b were drilled through the steel floor of the tank 12 to allow leak simulation at different locations on the tank floor. Background samples of evacuated air were analyzed for the presence of background chemicals which would interfere with the analysis. Dibromotetrafluoroethane (114B2) was selected to simulate leaks from the holes 51b, 52b near the perimeter of the tank 12. Dibromodifluoromethane (DDM) was employed to simulate leaks from holes 51a, 52b near the center of the tank. The concentration of tracer in the fuel was 10 ppm and the simulated leaks were 0.05 gal/hour.

The first phase of the test, the maximum air pressure test, was conducted by introducing a simulated leak of DDM in fuel solution into hole 51a located approximately ten feet from the tank center located in the sector between sample probes 41 and 42. A simulated leak of 114B2 was created by introducing a fuel solution containing 114B2 into hole 51b located approximately ten feet within the perimeter near sample probe 41. Air was injected into the air injection probe 31 at an air pressure of 40 psi measured at the perimeter of the tank. Leak simulation continued until termination of the experiment.

Tracer breakthrough at sample probe 41 occurred one hour after the commencement of leak simulation, and attained a constant concentration of tracer at that sample probe for one hour after initial breakthrough. The leak at hole 51b resolved as only a short pulse of the tracer initially observed at probe 41, indicating that the air flow was excessive.

The variable air pressure test involved simulating two leaks in the floor of tank 12. Leak 52a was located approximately ten feet from the center of the tank floor in the sector between sample probes 45 and 46. Leak 52b was located approximately ten feet inside the tank perimeter in the sector between probes 45 and 46. This variable air pressure test was conducted in two phases. A first phase, an evacuation only phase, involved evacuation of air from the six sample probes 41, 42, 43, 44, 45 and 46 disposed within the perimeter of tank 12. A second phase, an injection/evacuation phase, involved injecting ambient air through air injection probe 31 into the center of the tank 12, while concurrently evacuating air from the six sample probes 41, 42, 43, 44, 45 and 46 disposed within the perimeter of tank 12.

Leak simulation was initiated by injecting a DDM fuel solution at 52a and a 114B2 fuel solution at 52b. The first phase, evacuation only, was performed for two hours and resulted in no observation of tracer from either leak simulation point 52a or 52b. Phase two, the injection/evacuation phase, involved injecting air with stepped air pressure increases. Air injection was initiated at a pressure of 10 psi for one hour through air injection probe 31 while evacuating air through the six sample probes. The 114B2 tracer injected at leak simulation point 52b was immediately observed at sample probe 45. The DDM tracer injected at leak simulation point 52a was observed at sample probe 45 approximately forty-five minutes after initial air injection and two hours forty-five minutes after the initiation of testing. Air injection pressure was then increased to 25 psi for 0.5 hours. Tracer concentration from both leak simulation points 52a, 52b remained constant during this period. Finally, air injection pressure was increased to 40 psi for two hours. Again, tracer concentration from both leak simulation points 52a, 52b remained constant during this final period.

The results of this test clearly indicate that the present invention exhibits sensitivity sufficient to detect a leak of 0.05 gallons per hour. Moreover, by using proper sample probe placement and varying the air pressure from the air injection probe 31, leaks from all locations on the tank floor can be detected. Leaks near the perimeter of the tank are best detected by evacuation only, while leaks near the center are best detected using a combination of air evacuation and air injection. A test program beginning with a two hour evacuation-only period, followed by a stepped air pressure injection period run concurrently with air evacuation appears to provide the best results on a forty-five foot radius tank. Those skilled in the art will understand that each stage of the testing program may be adjusted for varying diameter tanks.

Figure 5:
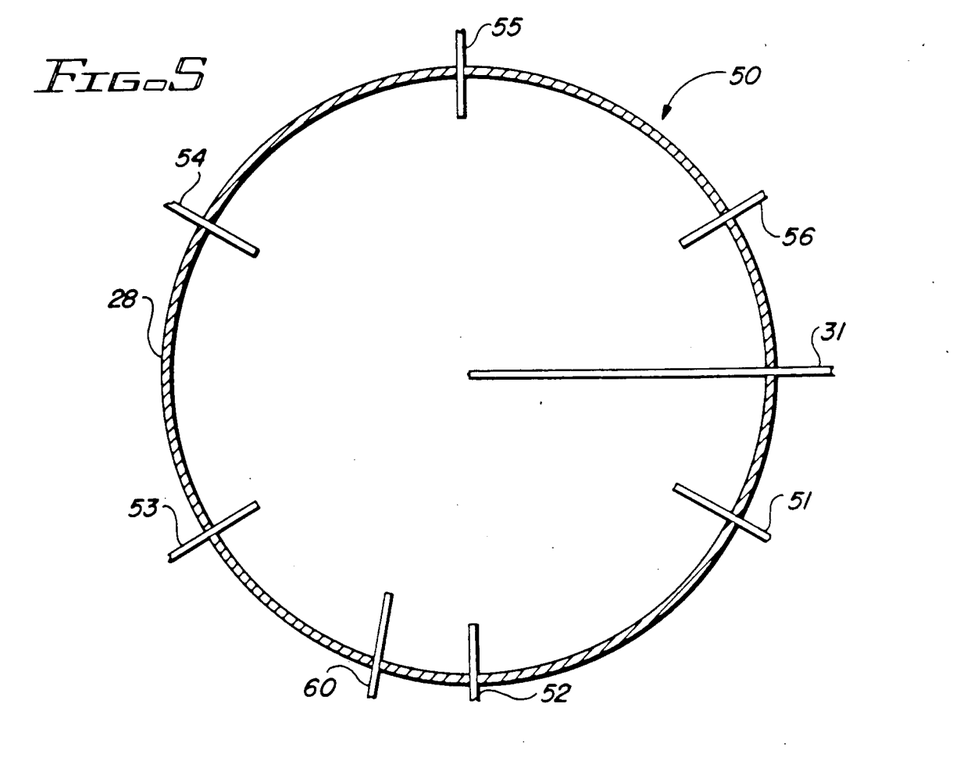
FIG. 5 is a diagrammatic plan view of the aboveground tank leak detection system of the present invention illustrating a test installation.

FIG. 5 diagrammatically represents the aboveground leak detection system of the present invention installed to test the integrity of a 700,000 gallon JP-4 fuel storage tank 28. An identical installation was made to test the integrity of a 535,000 gallon JP-4 fuel storage tank 27 and is diagrammatically represented in FIG. 7. For purposes of reference only, these test installations will be referred to as Test I and II, respectively.

For Test I, six sample probes 51, 52, 53, 54, 55 and 56, were radially disposed at a depth of eight to twelve inches in the subsurface soil area underneath the fuel storage tank 28 to a distance of five feet within the perimeter of the tank 28. An air injection probe 31 was disposed in the subsurface soil area underneath the fuel storage tank 28 and driven until the terminal end was at the center of the tank 28. A simulated leak probe 60 was installed at a random position under the tank. Background analyses of soil gas samples was conducted and dibromotetrafluoroethane (114B2) was selected as the tracer.

For Test I, 3.1 gallons of 114B2 were introduced into the tank 28 from a dispenser mounted near a ten inch receiving pipe associated with the tank 28 as the tank was being filled. Tracer concentration in the fuel was approximately 10 ppm. After a 24 hour mixing period, tank 28 was leak tested. A leak of 0.05 gallons/hours was simulated simultaneously with the tank testing by injecting trichlorofluoromethane (F-11) into leak simulation probe 60. Air injection from air injection probe 31 was not required during testing. The results of Test I are summarized in FIG. 6.

Figure 7:
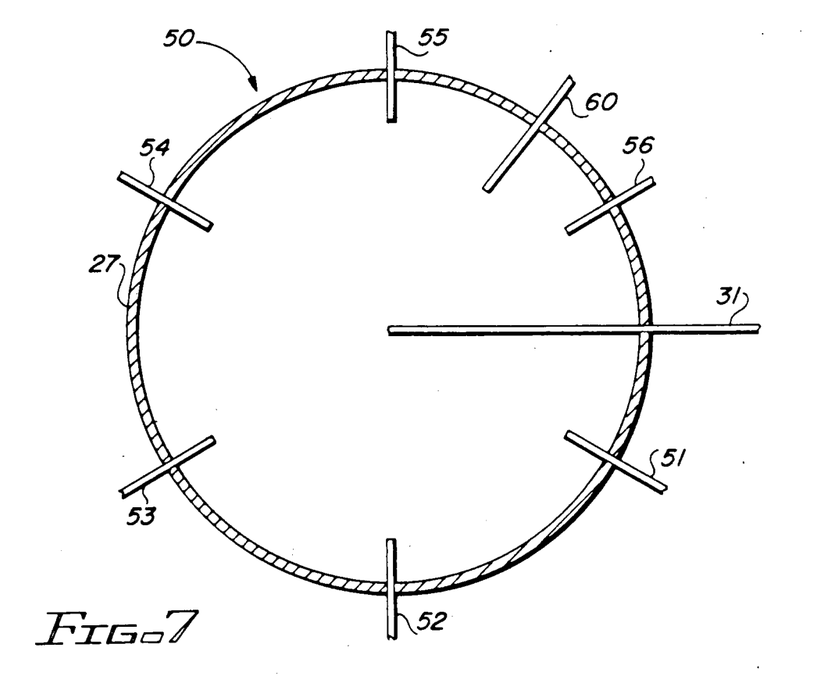
FIG. 7 is a diagrammatic plan view of the aboveground tank leak detection system of the present invention illustrating a test installation.

For Test II, six sample probes 51, 52, 53, 54, 55 and 56, were radially disposed at a depth of eight to twelve inches in the subsurface soil area underneath the fuel storage tank 27 to a distance of five feet within the perimeter of the tank 27. An air injection probe 31 was disposed in the subsurface soil area underneath the fuel storage tank 27 and driven until the terminal end was at the center of the tank 27. A simulated leak probe 60 was installed at a random position under the tank. Due to the density of the backfill, it was necessary to use a water-jet drill to bore paths for each of the sample probes, air injection probe and simulated leak probe. Background analyses of soil gas samples was conducted and dibromotetrafluoroethane (114B2) was selected as the tracer. 2.0 gallons of 114B2 were introduced into the tank 27 from a dispenser mounted near a ten inch receiving pipe associated with the tank 27 as the tank was being filled. Tracer concentration in the fuel was approximately 10 ppm. After a 24 hour mixing period, tank 27 was leak tested. A leak of 0.05 gallons/hours was simulated simultaneously with the tank testing by injecting trichlorofluoromethane (F-11) into leak simulation probe 60. Air injection from probe 31 was required during testing. The results of Test II are summarized in FIG. 8.

Figure 6:
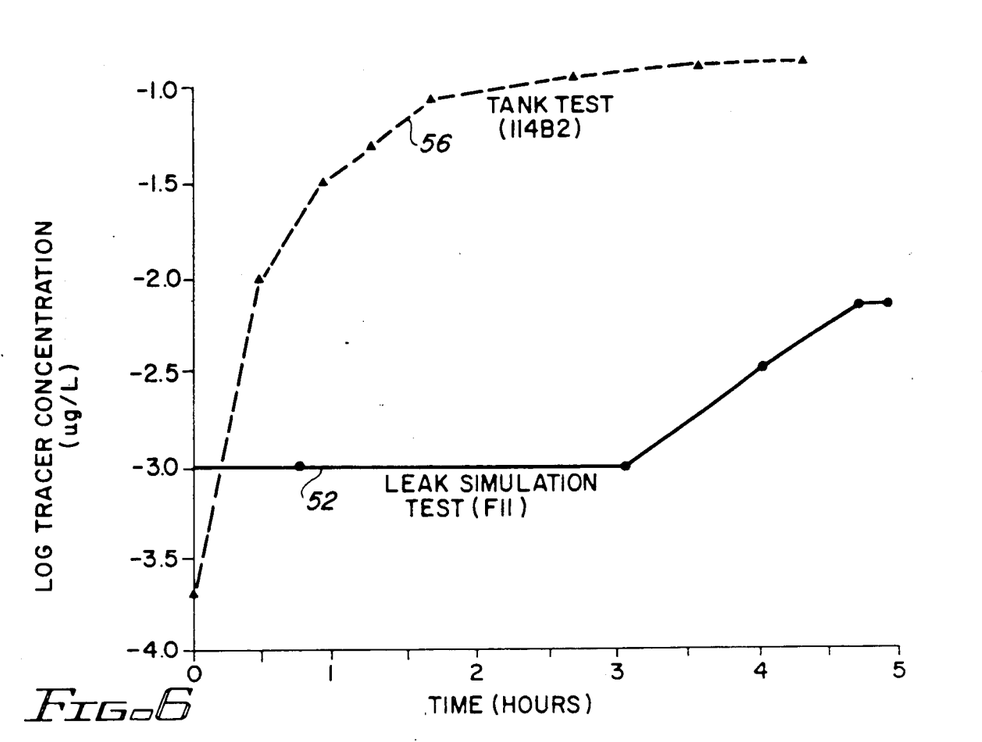
FIG. 6 is a graph of tracer concentration over time for a leak simulation and actual tank test employing the test installation depicted in FIG. 5.

The results of Test I on tank 28, graphically presented in FIG. 6, indicate the existence of a major fuel leak in the vicinity of sample probe 56. Tracer was observed in high quantities at sample probe 56 immediately during the evacuation step. The rate of leakage, which was determined by the leak simulation test, was estimated at 0.8 gallon/hour. The fact that the tracer appeared immediately upon evacuation strongly suggests that the leak is near the perimeter in the section between sample probes 51 and 56. In Test I, both the simulated leak and the actual leak exhibited idealized behavior in that the tank tracer and the tracer from the simulated leak build up in the evacuated air and reach a steady state concentration required for accurate leak rate quantification.

Figure 8:
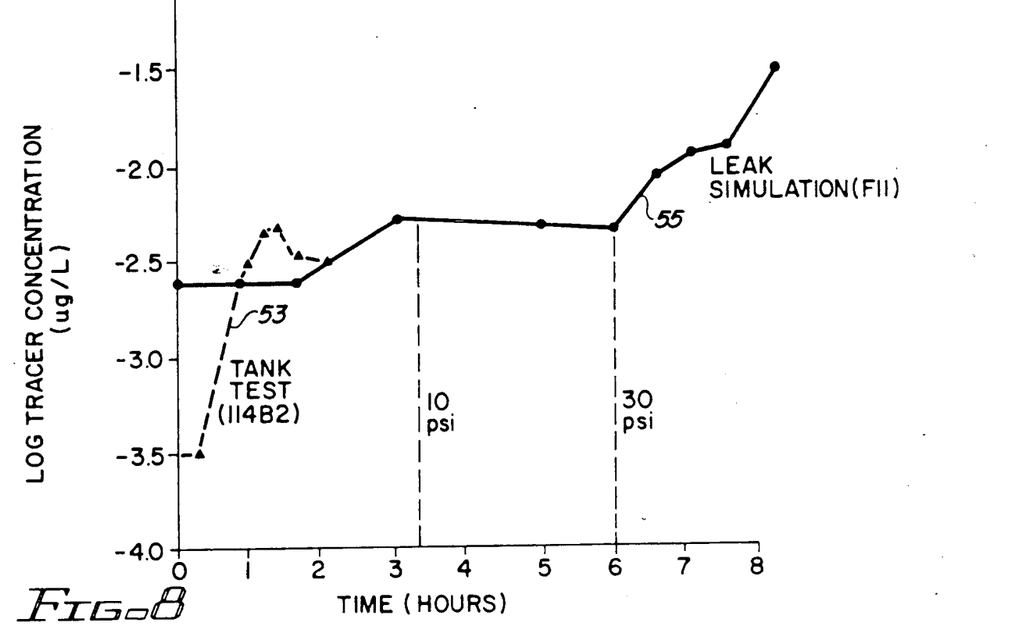
FIG. 8 is a graph of tracer concentration over time for a leak simulation and actual tank test employing the test installation depicted in FIG. 7.

The results of Test II on tank 27, graphically presented in FIG. 8, indicate the existence of a small fuel leak in the sector between sample probes 53 and 54. The maximum leakage rate, based upon comparison with the simulated leak rate, was estimated at 0.05 gallons per hour. Accurate leak rate quantification for Test II was complicated due to the failure of the tracer to produce a steady state tracer concentration in the evacuated air. It is believed that the need to use the water-jet drill to drill the bore holes for the sample probes, air injection probe and leak simulation probe introduced excess water into the backfill which impaired the air conductivity of the backfill.

Figure 9:
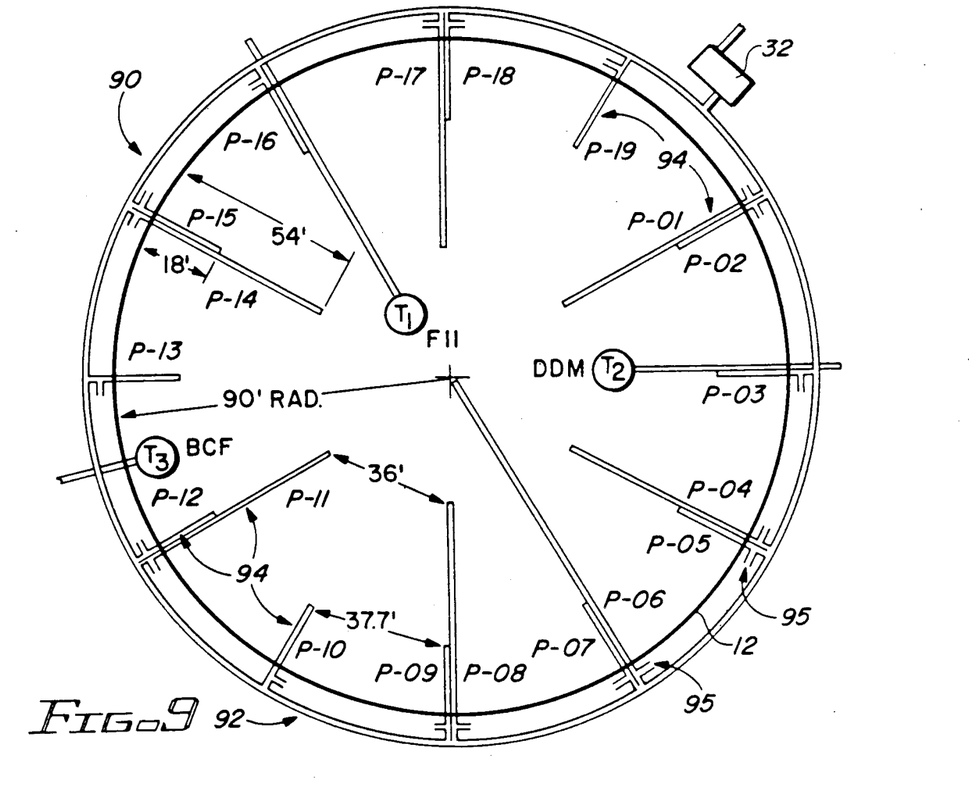
FIG. 9 is a diagrammatic plan view of the aboveground tank leak detection system illustrating an alternative embodiment of the present invention.

An alternative preferred embodiment of the present invention is illustrated with reference to FIG. 9 in the accompanying drawings. According to this alternative embodiment there is provided an above-ground fluid storage tank leak testing system 90 consisting of a plurality of sampling probes 94 which are disposed in the sub-surface soil area (not shown) underlying the above-ground tank 12. Those skilled in the art will understand and appreciate that the selection of the appropriate number of sampling probes 94 is dependent upon the diameter of the tank to be tested and the surface area of the tank floor.

Each of the plurality of sampling probes 94 is disposed underneath the above-ground tank 12 substantially in like manner as heretofore described. Each of the plurality of sampling probes 94 are operably connected to a common manifold 92 which encircles the entire circumference of the above-ground tank 12. Manifold 92 is, in turn, operably connected to a high volume vacuum pump 32 for evacuating sub-surface soil gases from the sub-surface soil area underneath the tank. Each sampling probe 94 has an associated sampling port 95 which are independently accessible and permit withdrawal of soil gas samples for chemical analysis. It has been found, according to this alternative preferred embodiment, that sufficient evacuation of soil gas samples is achieved without utilizing an air injection probe, such as that described with reference to the previously described embodiment.

As with the previous preferred embodiment heretofore described, the plurality of sampling probes 94 are inserted horizontally through the sand layer which forms the base pad for the tank floor. System testing entailed providing at least one of a plurality of tracer injection probes 96, 97, and 98 (sequentially labeled $T_1$, $T_2$, and $T_3$) which are horizontally disposed in the sand layer underneath the tank floor. According to the preferred embodiment, one tracer injection probe 96 ($T_1$) is positioned to represent leakage from the central area of the tank floor, a second tracer injection probe 97 ($T_2$) is positioned to represent leakage from the mid-radius area of the tank floor and a third tracer injection probe 98 ($T_3$) is positioned to represent leakage from the perimeter area of the tank floor.

In accordance with the embodiment of the invention illustrated with reference to FIG. 9, which is not to be construed as limiting the invention, nineteen sample probes (sequentially labeled P-1 through P-19) are radially disposed in the sand layer underneath the tank floor of a tank 12 having a 180 foot diameter. Each of the sample probes 94 are positioned such that all parts of the tank bottom are within twenty feet of the tip of a sampling probe. Vacuum pump 32 is selected to generate a sufficient vacuum to withdraw soil gases from an area around the tip of each sampling probe 94 to provide, relative to the position of the sampling probe tip, overlapping sub-surface regions from which soil gases are withdrawn. In this manner coverage to provided virtually the entire sub-surface area underneath the tank bottom.

The effectiveness of the above-ground tank leak detection system 90 was evaluated by simulating leakage under the tank by introducing diesel fuel spiked with a different and distinct liquid tracer into each of the three tracer injection probes 96, 97 and 98. Leakage was simulated at a rate of 0.05 gallons per hour with a tracer concentration of 10 ppm in the diesel fuel. F11 tracer was released at tracer injection probe 96 nearest the center of the tank, BCF tracer was released at tracer injection probe 98 near the perimeter of the tank and DDM tracer was released at tracer injection probe 97 at the mid-radius of the tank. Leakage was simulated for two twelve hour periods and evacuation was conducted concurrently with the leak simulation. Soil gas samples evacuated through the sampling probes 94 were periodically collected by tapping into sampling port 95 of each individual sampling probe 94.

The results indicated that the F11 tracer released at tracer injection probe 96 ($T_1$) near the center of the tank bottom was initially detected in most of the probes. However the greatest and only persistent concentration over the testing period were measured in probes P-6 and P-17, both of which terminate near the center of the tank bottom and are closest to the release point. The BCF tracer released at tracer injection probe 98 ($T_3$) near the perimeter of the tank bottom performed similarly to the F-11 tracer detection profile, i.e., it was initially detected at several probes, but after several hours, was detectable primarily in probe P-13 which was an adjacent perimeter probe. Finally, the DDM tracer, released at tracer injection probe 97 ($T_2$) situated at the mid-radius of the tank bottom, was initally detected in probe P-3 approximately ten hours after initial injection. Upon completion of the first twelve hour testing period, tracer injection and soil gas evacuation was discontinued for a period of appoximately twelve hours.

Upon resumption of testing, for the second twelve hour testing period, high concentrations of BCF and DDM tracers in the soil gases were immediately detected from the previous testing period. It appears, therefore, that there is a tendency for tracer vapors to accumulate, which enhances the sensitivity of the leak testing system 90. Routine leak testing will appear to benefit from a standing period of at least twenty-four hours after the tank is initially inoculated with tracer.

Thus, it will be appreciated by those skilled in the art, that a new and useful system and method for detecting leaks from aboveground fluid storage tanks has been described and disclosed. While there has been described what, at present, is considered to be the preferred embodiments of the present invention, it will be appreciated that various modifications and alterations may be made therein without departing from the true scope and spirit of the present invention, which the claims appended hereto are intended to cover.

I claim:

1. An apparatus for detecting a leak from an aboveground fluid storage tank disposed on a backfill material, comprising:
   volatile liquid phase tracer means for providing a gas phase detectable component in a fluid leak, a quantity of said volatile liquid phase tracer means being mixed with the fluid in said aboveground fluid storage tank;
   a plurality of sample probe members horizontally and radially disposed in the backfill material underneath the aboveground fluid storage tank; and
   evacuation means, operably coupled to said plurality of sample probe members, for evacuating gas samples from the backfill material underneath the aboveground fluid storage tank, into and through said at least one of a plurality of sample probe members.

2. The apparatus of claim 1, wherein the fluid in said aboveground tank is a liquid.

3. The apparatus of claim 1, wherein said fluid in said aboveground fluid storage tank is a gas.

4. The apparatus of claim 1, wherein said fluid in said aboveground fluid storage tank is fuel.

5. The apparatus of claim 1, wherein said apparatus further comprises means for collecting at least one sample of said gas drawn through said plurality of sample probe members.

6. The apparatus of claim 5, wherein said apparatus further comprising means for analyzing said at least one sample of said air drawn through said plurality of sample probe members.

7. The apparatus of claim 6, wherein said means for analyzing said at least one sample of said air further comprises a gas chromatograph.

8. The apparatus of claim 1, wherein said liquid phase tracer means is selected from the group consisting of halogenated halocarbons, methanes, ethanes and ethenes.

9. The apparatus of claim 1, wherein said liquid phase tracer means is a fluorinated halocarbon compound having a boiling point less than that of gasoline.

10. The apparatus of claim 1, wherein said liquid phase tracer means is selected from the group consisting of halogenated methanes, halogenated ethanes, sulfurhexafluoride, perfluorodecalin, and perfluoro 1,3 dimethylcyclohexane.

11. The apparatus of claim 10, wherein said liquid phase tracer means has a boiling point in the range of about $-72°$ C. and $150°$ C.

12. The apparatus of claim 1, wherein said liquid phase tracer means is a halogenated methane selected from the group consisting of chlorobromodifluoromethane, trifluoroiodomethane, trifluorobromomethane, dibromodifluoromethane, dichlorodifluoromethane and tetrafluoromethane.

13. The apparatus of claim 12, wherein said liquid phase tracer means has a boiling point in the range of about $-72°$ C. and $150°$ C.

14. The apparatus of claim 1, wherein said liquid phase tracer means is a halogenated ethane selected from the group consisting of dichlorotetrafluoroethane, hexafluoroethane, trichlorotrifluoroethane, dibromotetrafluoroethane and tetrachlorodifluoroethane.

15. The apparatus of claim 14, wherein said liquid phase tracer means has a boiling point in the range of about $-72°$ C. and $150°$ C.

16. The apparatus of claim 1, wherein said tracer is a halogenated ethene comprising tetrafluoroethene.

17. The apparatus of claim 1, wherein said boiling point of said liquid phase tracer means is between about $-72°$ C. and $150°$ C.

18. The apparatus of claim 1, wherein said apparatus further comprises at least one air injection member for injecting air, under pressure, into the backfill material underneath the aboveground fluid storage tank, said at least one air injection member being horizontally and radially disposed in the backfill material underneath the aboveground fluid storage tank and having an open end thereof positioned substantially centrally relative to a central vertical axis of the aboveground fluid storage tank.

19. The apparatus of claim 1, wherein said apparatus further comprises leak simulation means for simulating a leak in the backfill material underneath the aboveground fluid storage tank.

20. The apparatus of claim 19, wherein said leak simulation means further comprises a hollow tubular member disposed in the backfill material and positioned such that a simulated leak may be introduced into the backfill material underneath the perimeter of the aboveground fluid storage tank.

21. The apparatus of claim 20, wherein said leak simulation means further comprises a different and distinct volatile liquid phase tracer mixed with fluid from the aboveground fluid storage tank, said tracer-doped fluid being introduced into the backfill material through said hollow tubular member to simulate a fluid leak in the backfill material.

22. The apparatus of claim 20, wherein said different and distinct volatile liquid phase tracer means is selected from the group consisting of halogenated, halocarbons, methanes, and ethanes and ethenes.

23. The apparatus of claim 22, wherein said different and distinct volatile liquid phase tracer means is a halocarbon compound having a boiling point less than that of gasoline.

24. The apparatus of claim 21, wherein said different and distinct volatile liquid phase tracer means is selected from the group consisting of halogenated methanes, halogenated ethanes, halogenated ethenes, sulfurhexafluoride, perfluorodecalin, and perfluoro 1,3 dimethylcyclohexane.

25. The apparatus of claim 24, wherein said liquid phase tracer means has a boiling point in the range of about $-72°$ C. and $150°$ C.

26. The apparatus of claim 21, wherein said different and distinct liquid phase tracer means is a halogenated methane selected from the group consisting of chlorobromodifluoromethane, trifluoroiodomethane, trifluorobromomethane, dibromodifluoromethane, dichlorodifluoromethane and tetrafluoromethane.

27. The apparatus of claim 26, wherein said liquid phase tracer means has a boiling point in the range of about $-72°$ C. and $150°$ C.

28. The apparatus of claim 21, wherein said different and distinct liquid phase tracer means is a halogenated ethane selected from the group consisting of dichlorotetrafluoroethane, hexafluoroethane, trichlorotrifluoroethane, dibromotetrafluoroethane and tetrachlorodifluoroethane.

29. The apparatus of claim 28, wherein said liquid phase tracer means has a boiling point in the range of about $-72°$ C. and $150°$ C.

30. The apparatus of claim 21, wherein said halogenated ethene further comprises tetrafluoroethene.

31. The apparatus of claim 21, wherein said boiling point of said liquid phase tracer means is between about $-72°$ C. and $150°$ C.

32. The apparatus according to claim 1, wherein said evacuation means further comprises a manifold operably connected to each of said plurality of sample probe members.

33. The apparatus according to claim 32, wherein said evacuation means further comprises at least one gas sampling port associated with each of said plurality of sample probe members, said at least one gas sampling port being provided relatively upstream from the connection between each of said plurality of sample probe members and said manifold.

34. A method for detecting a leak from an aboveground fluid storage tank disposed on a backfill material, comprising the steps of:
mixing a volatile liquid phase tracer means for providing a gas phase detectable component in a fluid leak with the fluid in said aboveground fluid storage tank;
disposing a plurality of sample probe members in the backfill material horizontally and radially underneath the aboveground fluid storage tank;
evacuating soil gas into and through said at least one of a plurality of sample probe members; and
collecting and analyzing said evacuated soil gas for the presence of said gas phase tracer for determining when a leak is present in the aboveground fluid storage tank.

35. The method of claim 34, wherein said step of collecting and analyzing said evacuated soil gas further comprises analyzing said collected soil gas for the presence of gas phase tracer by gas chromatography.

36. The method of claim 34, wherein said mixing step further comprises the step of selecting said liquid phase from the group consisting of halogenated methanes, ethanes and ethenes.

37. The method of claim 34, wherein said mixing step further comprises the step of selecting said liquid phase tracer means to be a fluorinated halocarbon compound having a boiling point less than that of gasoline.

38. The method of claim 34, wherein said mixing step further comprises the step of selecting said liquid phase tracer means from the group consisting of halogenated methanes, halogenated ethanes, halogenated ethenes, sulfurhexafluoride, perfluorodecalin, and perfluoro 1,3 dimethyl cyclohexane.

39. The method of claim 38, wherein said mixing step further comprises selecting said liquid phase tracer means to have a boiling point in the range of about $-72°$ C. and $150°$ C.

40. The method of claim 34, wherein said mixing step further comprises selecting said liquid phase tracer means from the group of halogenated methanes consisting of chlorobromodifluoromethane, trifluoroiodomethane, trifluorobromomethane, dibromodifluoromethane, dichlorodifluoromethane and tetrafluoromethane.

41. The method of claim 40, wherein said step of selecting said liquid phase tracer means further comprises selecting said halogenated methane which has a boiling point in the range of about $-72°$ C. and $150°$ C.

42. The method of claim 34, wherein said mixing step further comprises the step of selecting said liquid phase tracer means from the group of halogenated ethanes consisting of dichlorotetrafluoroethane, hexafluoroethane, trichlorotrifluoroethane, dibromotetrafluoroethane and tetrachlorodifluoroethane.

43. The method of claim 42, wherein said step of selecting said liquid phase tracer means further comprises selecting said halogenated ethane which has a boiling point in the range of about $-72°$ C. and $150°$ C.

44. The method of claim 34, wherein said selecting step further comprises selecting said liquid phase tracer means to be tetrafluoroethene.

45. The method of claim 34, wherein said method further comprises the step of disposing air injection means for injecting air, under pressure, horizontally and radially into the backfill material underneath the aboveground fluid storage tank, said means having an open end thereof disposed in the backfill material underneath the aboveground fluid storage tank, said open end being positioned substantially centrally with respect to a central vertical axis of said aboveground fluid storage tank.

46. The method of claim 45, wherein said step of disposing air injection means further comprises disposing a hollow tubular member in the backfill material and positioning said hollow tubular member such that air is injected into the backfill material substantially centrally with respect to the aboveground fluid storage tank.

47. The method of claim 34, wherein said method further comprises the step of disposing leak simulation means into the backfill material for simulating a leak in the backfill material underneath the aboveground fluid storage tank.

48. The method of claim 47, wherein said step of disposing leak simulation means further comprises disposing a hollow tubular member in the backfill material and positioning said hollow tubular member such that a simulated leak may be introduced into the backfill material underneath the perimeter of the aboveground fluid storage tank.

49. The method of claim 47, wherein said method further comprises the step of simulating a leak by introducing a different and distinct volatile liquid phase tracer mixed with fluid from the aboveground fluid storage tank into the backfill material through said leak simulation means concurrently with said step of evacuating soil gas.

50. The method of claim 49, wherein said step of introducing a different and distinct volatile liquid phase tracer means further comprises the step of selecting said different and distinct volatile liquid phase tracer means consisting of halogenated methanes, ethanes and ethenes.

51. The method of claim 50, wherein said selecting step further comprises the step of selecting said different and distinct volatile liquid phase tracer means to be halocarbon compound having a boiling point less than that of fuel.

52. The method of claim 50, wherein said selecting step further comprises the step of selecting said different and distinct volatile liquid phase tracer means from the group consisting of halogenated methanes, halogenated ethanes, halogenated ethenes, sulfurhexafluoride, perfluorodecalin, and perfluoro 1,3 dimethylcyclohexane.

53. The method of claim 52, wherein said selecting step further comprises selecting said different and distinct liquid phase tracer means to have a boiling point in the range of about $-72°$ C. and $150°$ C.

54. The method of claim 42, wherein said step of selecting a different and distinct liquid phase tracer means further comprises selecting a halogenated methane from the group consisting of chlorobromodifluoromethane, trifluoroiodomethane, trifluorobromomethane, dibromodifluoromethane, dichlorodifluoromethane and tetrafluoromethane.

55. The method of claim 54, wherein said step of selecting a different and distinct liquid phase tracer means further comprises selecting a halogenated methane having a boiling point in the range of about $-72°$ C. and $150°$ C.

56. The mehod of claim 49, wherein said step of selecting a different and distinct liquid phase tracer means further comprises selecting a halogenated ethane from the group consisting of dichlorotetrafluoroethane, hexafluoroethane, trichlorotrifluoroethane, dibromotetrafluoroethane and tetrachlorodifluoroethane.

57. The method of claim 56, wherein said step of selecting a different and distinct liquid phase tracer means further comprises selecting a halogenated ethane which has a boiling point in the range of about $-72°$ C. and $150°$ C.

58. The method of claim 56, wherein said step of selecting a different and distinct liquid phase tracer means further comprises the step of selecting tetrafluoroethene.

* * * * *